Sept. 7, 1937.    S. RÖSCH    2,092,588
LIGHT GAUGE FOR PHOTOMETERS
Filed Feb. 26, 1935
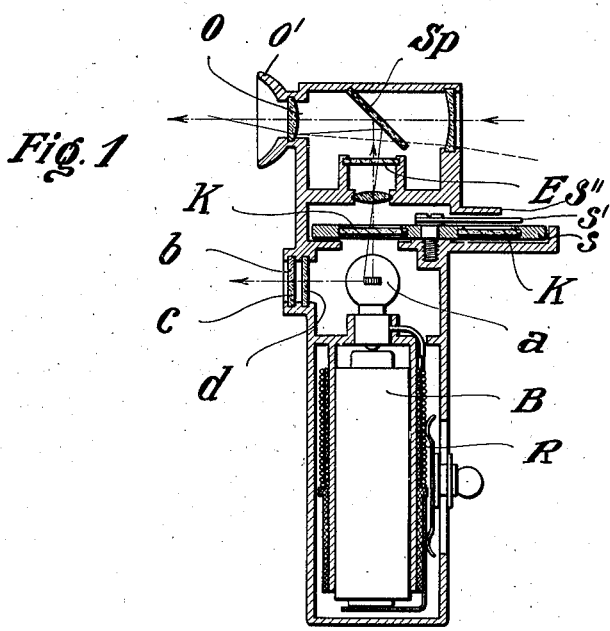
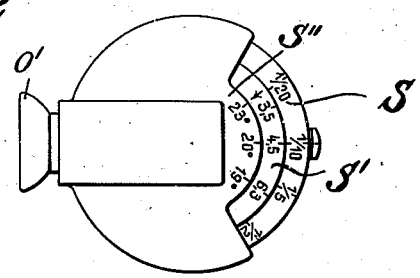
INVENTOR
Siegfried Rösch
BY
ATTORNEY Patented Sept. 7, 1937

2,092,588

UNITED STATES PATENT OFFICE 2,092,588

LIGHT GAUGE FOR PHOTOMETERS

Siegfried Rösch, Wetzlar, Germany, assignor to Ernst Leitz G. m. b. H., Wetzlar, Germany Application February 26, 1935, Serial No. 8,273
In Germany February 28, 1934

1 Claim. (Cl. 88—23)

The present invention has for its object a device for comparing the intensity of light sources in photometers and gauging the same to a predetermined degree of brightness.

The various known devices intended for this purpose are using gauging instruments either along or in connection with a photo-cell. Furthermore, radio-active substances have been used as sources of light for comparison purposes. However, these known devices are very voluminous, consequently very irksome to handle and to transport, are expensive and give mostly unsatisfactory results.

I avoid these disadvantages principally by using two filters in front of the source of light of which one is dichromatic and changes its color according to the color temperature of the source of light, while the other is monochromatic and serves as filter of comparison.

Another object of my invention is the provision of a comparison lamp fed from a battery and regulated by means of a suitable resistance.

A further object of my invention is the provision of a light gauging device for photometers in which the filament of the source of light is reflected into the picture of the object by the intermediary of a partly opaque, partly transparent silvered mirror.

A still further object of my invention is the provision of a light gauge for photometers including a rotatable blackened wedge, the rotation of which allows the reading of the light values from a scale.

These and other objects and advantages of my invention will become more fully known as the description thereof proceeds, and will then be more specifically defined in the appended claim.

In the accompanying drawing forming a material part of this disclosure:

Fig. 1 is a side elevation of a device constructed according to my invention, partly in section, Fig. 2 is a top plan view thereof illustrating the scale of the device.

As illustrated, in a photometer of known construction the filament of an electric lamp $a$ fed from a battery B is reflected by means of a partly silvered mirror $Sp$ into the picture of the object before ocular O held in a tubular barrel O'. By means of a light dimmer member, for instance a turnable blackened wedge K, the light can be regulated to a desired grade of brightness. Another transparent element or member E having a coat of blackening varying with the photometric utilizable degree of brightness is interposed between the light $a$ and the partly silvered mirror $Sp$. The member E is transparent and has a blackened face of a shade assisting the blackened wedge K in regulating the brightness of the vertical light beam from the lamp to the desired and suitable degree. The filter $b$ is dichromatic and the filter $c$ monochromatic and filter the horizontal light beam from the lamp, and by the proper regulation of the resistances the brightness best suited for the reading of the exposure value on the scale S is ascertained as soon as dichromatic filter shows the same color as the monochromatic filter.

Two filter plates $b$ and $c$ are arranged laterally to the lamp $a$ and independently from the vertically directed light rays from the lamp, and plate $b$ is preferably dichromatic and is apt to reproduce during the comparison of the degrees of light brightness a distinct color tine, while the plate $c$, juxtaposed to plate $b$, is monochromatic and is kept in a color corresponding to the color of the dichromatic filter. For the purpost of enabling a regulation of the brightness of the source of light for comparing purposes, a resistance R is provided.

In order to weaken the brightness of the light, in front of both filters is arranged another filter, for instance a frosted pane $d$. The turning of the blackened wedge K will allow a reading of the exposure values on the scales S, S' and S'' respectively indicating the different degrees of the light values.

In use, the gauging of the light intensity to be compared, the regulating resistance R is displaced until both filter plates appear to have uniform color, as long as the dichromatic filter has another color for instance red, while the regulating color is yellow, the resistance must be manipulated to change the brightness of the source of light for comparison.

It will be understood that I have described and shown the preferred form of my invention as one example only of the many possible ways to practically construct the same and that I may make such changes in its general arrangement and in the construction of its minor details as come within the scope of the appended claims without departure from the spirit of my invention and the principles involved.

Having thus described my invention, what I claim as new and desire to secure by Letters Patent is:

A photometer comprising a vertically disposed main body tube the top portion of the tube having two aligned openings in one of which is mounted an eyepiece for sighting through the tube and at the source of light to be measured, a comparison source of light and a battery electrically connected thereto mounted in the lower part of said body tube, a light transmitting reflector positioned in the tube in the line of sight of the eyepiece and directly above the comparison light source so as to reflect light therefrom into the eyepiece, adjustable light regulating means positioned in the tube between the comparison light source and the reflector, a pair of light filters mounted side by side in an opening in a vertical wall of the tube at the level of the comparison light source, one filter being dichromatic and the other monochromatic and adjustable resistance means in the circuit of the comparison light source.

SIEGFRIED RÖSCH.